(12) United States Patent
Mientus et al.

(10) Patent No.: US 6,403,005 B1
(45) Date of Patent: Jun. 11, 2002

(54) METHOD OF MANUFACTURING A HIGH DOI/HIGH GLOSS MULTIFUNCTIONAL THERMOPLASTIC FILM

(75) Inventors: Bernard S. Mientus, Painesville; Michael Hannington, Madison; Luigi V. DiCarlo, Concord, all of OH (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/542,135

(22) Filed: Apr. 4, 2000

(51) Int. Cl.⁷ .................... B29C 47/06; B32B 27/08
(52) U.S. Cl. .................... 264/173.1; 264/173.14; 264/173.19; 264/210.2; 264/284; 428/515
(58) Field of Search .................... 264/173.1, 173.12, 264/173.14, 173.19, 210.2, 284, 466, 293, 465; 428/515, 516, 517

(56) References Cited

U.S. PATENT DOCUMENTS

| | | | |
|---|---|---|---|
| 2,697,893 A | 12/1954 | Schaum | 41/21 |
| 3,389,036 A | 6/1968 | Rudolph et al. | 158/244 |
| 3,504,075 A | 3/1970 | Williams et al. | 264/175 |
| 3,540,959 A | 11/1970 | Connor | 156/203 |
| 4,021,179 A | 5/1977 | Pira et al. | 425/369 |
| 4,234,300 A | 11/1980 | Yamagisi et al. | 425/363 |
| 4,376,147 A | 3/1983 | Byrne et al. | 428/167 |
| 4,546,029 A | 10/1985 | Cancio et al. | 428/141 |
| 4,713,273 A | 12/1987 | Freedman | 428/40 |
| 4,888,075 A | 12/1989 | Freedman | 156/243 |
| 4,895,760 A | 1/1990 | Barger | 428/332 |
| 4,946,532 A | 8/1990 | Freeman | 156/243 |
| 5,100,709 A | 3/1992 | Barger | 428/41 |
| 5,158,836 A | 10/1992 | Schirmer et al. | 428/336 |
| 5,219,666 A | 6/1993 | Schirmer et al. | 428/521 |
| 5,372,669 A | 12/1994 | Freedman | 156/243 |
| 5,389,448 A | 2/1995 | Schirmer et al. | 428/517 |
| 5,693,405 A | 12/1997 | Harvie et al. | 428/156 |
| 5,730,919 A | 3/1998 | Wilfong et al. | 264/173.11 |
| 6,083,443 A | 7/2000 | Eckart et al. | 264/173.14 |

OTHER PUBLICATIONS

PCT/US01/09385; International Search Report mailed Jul. 9, 2001.

*Primary Examiner*—Mark Eashoo
(74) *Attorney, Agent, or Firm*—Renner, Otto, Boisselle & Sklar, LLP (57) ABSTRACT

A method of making a high gloss, multilayered thermoplastic film by pinning the extruding the molten thermoplastic film material onto a polished casting roll having a mirror finish. The thermoplastic film produced by this method has a superior gloss finish and has a ratio of distinctness of image in the machine direction to distinctness of image in the cross direction in the range of 1.3:1 to 1.0:1, and has a 20° gloss in the machine direction and the cross direction of at least 40.

19 Claims, 3 Drawing Sheets

METHOD OF MANUFACTURING A HIGH DOI/HIGH GLOSS MULTIFUNCTIONAL THERMOPLASTIC FILM

TECHNICAL FIELD

This invention relates to a method of manufacturing a multilayered thermoplastic film having a high distinctness of image and high gloss finish. These high gloss thermoplastic films are useful as computer graphic films.

BACKGROUND OF THE INVENTION

It is often desirable to use polymer films in computer graphics applications that have a high gloss finish. Such polymer films are currently produced by a number of different manufacturing methods.

Polymer films typically used with graphic applications are calendered. The calendaring operation compresses the film between a series of steel rolls. As the calendaring increases, the film becomes smoother and glossier. Polymer films useful for graphic applications may also be dispersion cast polyvinyl chloride (PVC) monolayer films. While the use of these PVC films have met with success in the marketplace, they have also been found to be not entirely acceptable. Neither the films nor the processes for making such films are environmentally friendly. Many of the PVC films employ plasticizers that migrate into the adhesive and degrade the functionality of the adhesive composite. Plasticizer migration is also considered to be related to objectionable spotty film appearance, sometimes referred to as mottle. This problem is especially troublesome in warm weather climates. In addition, many of the processes for making the PVC films are costly.

Another method of making high gloss polymeric films is to dispersion cast the polymer film onto a polyester casting sheet or onto paper coated with polyester. The films produced have relatively high distinctness of image and gloss, however, the cost of the polyester casting sheet is an undesired added expense.

High gloss polymeric films may be prepared by extrusion casting the polymeric film material onto a polished casting roll and pinning the film as it exits the extrusion die to the casting roll with an air knife. There are several problems associated with this process, including the inconsistent appearance of the polymeric film. The air knife causes ripples or waves in the polymeric film and the film may appear very glossy in some areas and less glossy in others. Also, while the gloss measured in the machine direction is high, the gloss measured in the cross direction is much lower. In addition, gels, which are unmelted polymeric particles formed in the extrusion process or crosslinked particles inherent to a resin, may protrude from the polymeric film surface. These protruding gels cause difficulties in subsequent printing processes because of the uneven film surface. The present invention, which relates to a novel method of manufacturing high gloss thermoplastic films, overcomes these problems.

SUMMARY OF THE INVENTION

The present invention relates to a method of making a high gloss multilayer thermoplastic film comprising:
(a) forming a molten coextrudate of polymeric film layers, the polymeric film layers comprising:
at least one polyolefin core layer having a first side and a second side;
at least one first thermoplastic skin layer having an outer surface wherein the first thermoplastic skin layer overlies the first side of the core layer; and
at least one second thermoplastic skin layer having an outer surface wherein the second thermoplastic skin layer overlies the second side of the core layer;
wherein the composition of the core layer is different than the composition of the skin layers and the core layer and the skin layers being characterized by the absence of polyvinyl chloride;
(b) pinning said molten coextrudate onto a cooled casting roll having a surface roughness of no more than $R_a=0.025$ microinches with a pinning roll under sufficient pressure to produce a film having a smooth first skin layer outer surface, wherein the smooth first skin layer outer surface has a ratio of distinctness of image in the machine direction to distinctness of image in the cross direction in the range of 1:1 to 1.3:1 and has a 20° gloss of at least 40 in both the cross direction and the machine direction.

In one aspect, the invention relates to a multilayered thermoplastic film, comprising: a thermoplastic core layer having a first side and a second side, the core layer comprising: a polyolefin having a density in the range of about 0.89 to about 0.97 grams per cubic centimeter; and a light stabilizer; at least one clear first thermoplastic skin layer having an outer surface, wherein the first thermoplastic skin layer overlies the first side of the core layer, the at least one first skin layer comprising a light stabilizer; and at least one second thermoplastic skin layer on an opposed second side of the core layer, the at least one second skin layer comprising a light stabilizer; the composition of the core layer being different than the composition of the skin layers, the core layer and the skin layers being characterized by the absence of polyvinyl chloride (PVC), and the outer surface of the first skin layer characterized by a ratio of distinctness of image in the machine direction to distinctness of image in the cross direction in the range of 1:1 to 1.3:1 and has a 20° gloss of at least 40 in both the cross direction and the machine direction.

BRIEF DESCRIPTION OF THE DRAWINGS

In the annexed drawings, like references indicate like parts or features.

DESCRIPTION OF THE PREFERRED EMBODIMENTS

The multilayered thermoplastic film 12 (FIG. 1) is made using a polymeric coextrusion process. The coextrudate of polymeric film materials is formed by simultaneous extrusion from two or more extruders and a suitable known type of coextrusion die whereby the core layer 16 and the skin layers 18 and 20 are adhered to each other in a permanently combined state to provide a unitary coextrudate.

Figure 3:
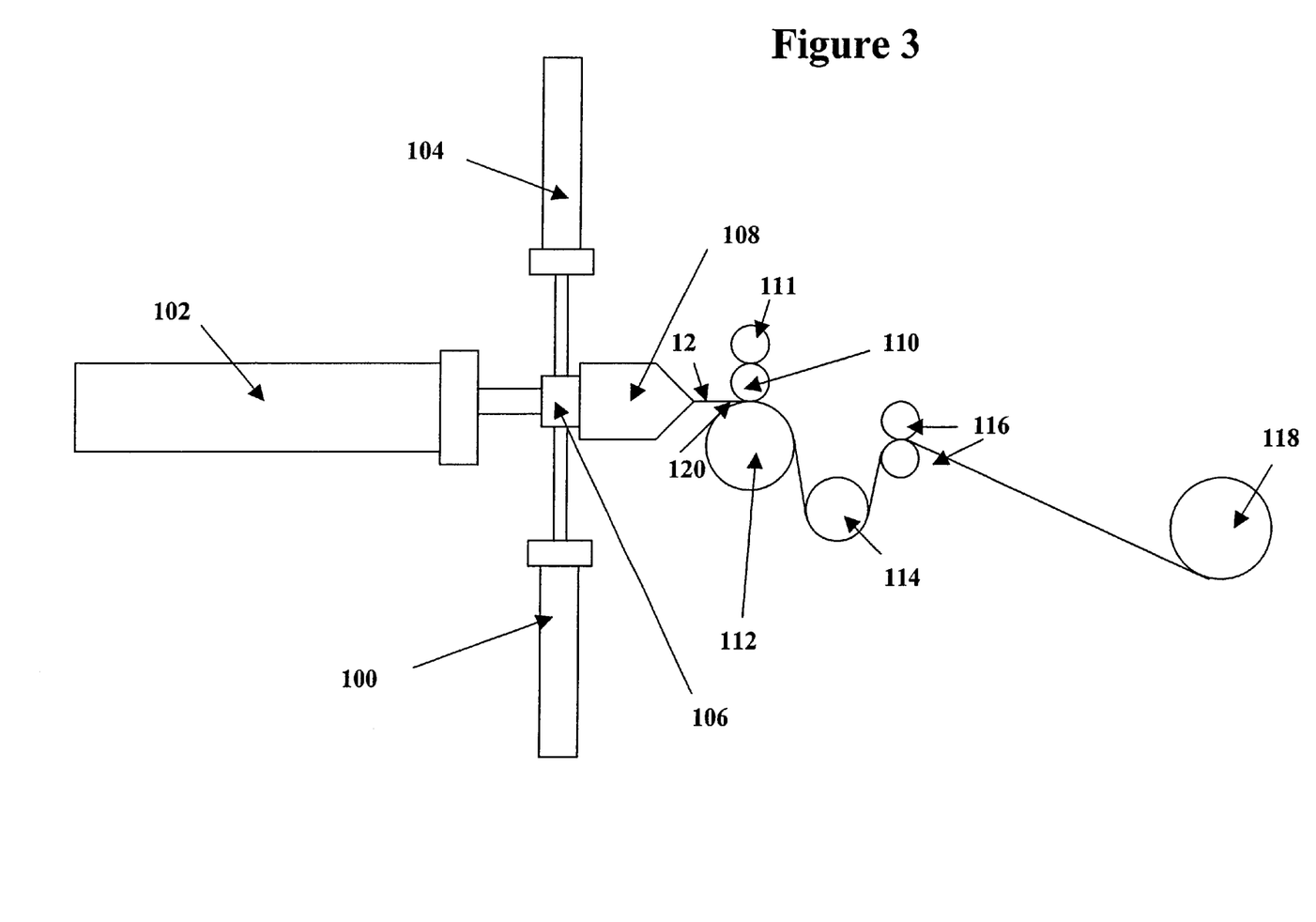
FIG. 3 is a flow sheet illustrating an extrusion process for making the high gloss multilayered thermoplastic film illustrated in FIG. 1.

Referring to FIG. 3, an extrusion process for making the multilayered film 12 is disclosed. The apparatus used in this process includes extruders 100, 102 and 104, adapter block 106, extrusion die 108, pinning roll 110, polished casting roll 112, chill roll 14, nip rolls 116, and the take-up reel 118. The polymeric material for forming skin layer 18 is extruded from extruder 100 and then advanced to adapter block 106 and extrusion die 108. The polymeric material for forming core layer 16 is extruded from extruder 102 and then advanced to adapter block 106 and extrusion die 108. The polymeric material for forming skin layer 20 is extruded from extruder 104 and then advanced to adapter block 106 and extrusion die 108. In extrusion die 108, the polymeric materials are combined to form the molten multilayered film 12. The molten multilayered film 12 is advanced from the extrusion die 108, to the nip 120 formed between the casting roll 112 and the pinning roll 110, over casting roll 112, under chill roll 114, through tension rolls 116 to take up reel 118 where it is wound to provide multilayered film 12 in roll form. Rider roll 111 acts to cool the surface of pinning roll 110.

The casting roll is preferably made from polished steel, and has a mirror finish with a surface roughness of no more than $R_a=0.025$ microinches. Preferably, the casting roll has a surface roughness of no more than $R_a=0.0125$ microinches. $R_a$ is the arithmetic average height of the micropeaks to the center line of a particular finished surface as measured by a profilometer. A lower $R_a$ value means that the surface of the casting roll is smoother, and the resulting thermoplastic film will have an outer skin surface that is also smoother. Because of the high temperature of the molten extrudate, the casting roll is internally cooled. The temperature of the polished casting roll must be below the crystalline freezing point of the thermoplastic polymers with which it comes into contact. In one embodiment, the polished casting roll is cooled to a temperature below the crystalline freezing point of the thermoplastic polymer of skin layer 18 of FIG. 1.

The pinning roll is may be made from a silicone rubber material, HYPALON® or NEOPRENE® synthetic rubber materials, or other similar materials. The pinning roll must be made from a material having high temperature resistance. The hardness of the pinning roll material is typically in the range of 60–90 on the Shore D scale, as measured by Durometer Hardness per ASTM Standard D-2240-97. Preferably, the hardness of the pinning roll is in the range of 65–70 on the Shore D scale. The surface roughness of the pinning roll is in the range of $R_a=10$ to 70 microinches. In one embodiment, the surface roughness of the pinning roll is in the range of $R_a=20$ to 30 microinches. The pinning roll must be made from a material having high temperature resistance. The pinning roll is also internally cooled and may be arranged to be in constant contact with a cooling roll 111 (FIG. 3).

The pressure in the nip area, formed between the casting roll and the pinning roll, varies depending on the polymeric extrudate and the film to be formed. Generally, the pressure is in the range of 30 to 100 pounds per linear inch (pli). The pressure should be sufficient to pin the extrudate to the casting roll and to push any gels that may have formed in the extrusion process into the interior of the film. By minimizing the number of gels present on the film surface, the damage due to denting or dimpling will be minimized. Additionally, this smoother surface is particularly advantageous in subsequent printing procedures.

While the outer surface of the first skin, which is in contact with the polished casting roll, has a smooth and glossy finish, the outer surface of the second skin, which is in contact with the pinning roll, preferably has a matte finish. The matte finish allows for the formation of air spaces between successive layers of film as it is turned onto the take-up reel. These air spaces prevent the layers from adhering to one another and forming a solid unusable piece. The matte surface also allows for air egress as the film is rolled so that deforming air bubbles are not formed.

Figure 1:
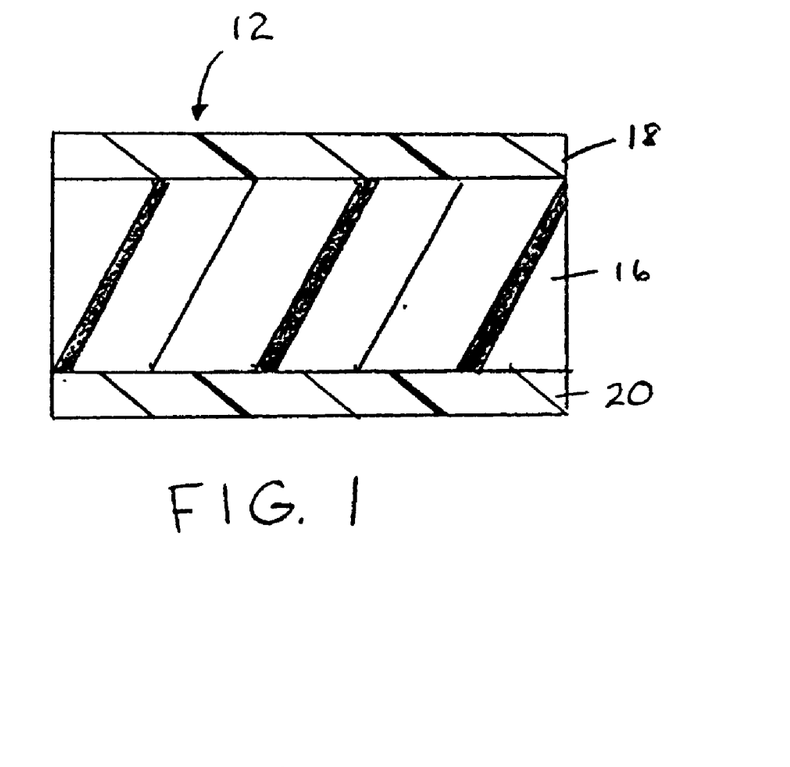
FIG. 1 is a schematic illustration of the side view of a multilayered thermoplastic film embodying the present invention in a particular form, the film comprising a thermoplastic core layer having a first side and a second side, an abrasion resistant first thermoplastic skin layer overlying the first side of the core layer, and a second thermoplastic skin layer overlying the second side of the core layer.

An advantage of the present invention is that the multilayered film 12 is easy to process. The presence of the clear skin layers 18 and 20 allows for easy purging and changing of colors during extrusion. These multilayered films have an attractive, high-gloss finish, sign cut and weed well. They may have excellent scuff and abrasion resistant characteristics. They may also have excellent outdoor weatherability characteristics.

The outer surface of the first skin layer has a distinctness of image (DOI), as measured by Analytical Measurement Technology's model ATI 1864 glossmeter, of at least 60 in the machine direction and at least 45 in the cross direction. In one embodiment, the DOI in the machine direction is at least 65 and the DOI in the cross direction is at least 55. The gloss of the outer surface of the first skin layer, may be measured by Hunterlab's ProGloss model PRO-3 glossmeter at 200 and 60° in both the machine direction and the cross direction. In one embodiment, the 60° gloss in both the machine direction and the cross direction is at least 70, and in another embodiment is at least 85. In one embodiment, the 20° gloss in both the machine direction and the cross direction is at least 40. In another embodiment the 20° gloss in both the machine direction and the cross direction is at least 50, and in yet another embodiment, the 20° gloss in both the machine direction and the cross direction is at least 65. Hunterlabs, the manufacturer of the ProGloss PRO-3 glossmeter, recommends relying on the 20° gloss measurement for samples in which the 60° gloss is greater than 70.

The ratio of the DOI in the machine direction to the DOI in the cross direction provides an indication of the quality of the resulting high gloss finish. The closer the ratio is to 1.0:1, the better the appearance of the film. High gloss films prepared by dispersion casting a film onto polyester coated paper generally have a DOI ratio of machine direction to cross direction of about 1.1:1. High gloss films prepared by extruding a polymer film and then air knife pinning the extrudate to a casting roll generally have a DOI ratio of machine direction to cross direction of about 1.5:1. The DOI ratio of machine direction to cross direction for the high gloss films of the present invention is within the range of about 1.3:1 to 1.0:1.

Figure 4:
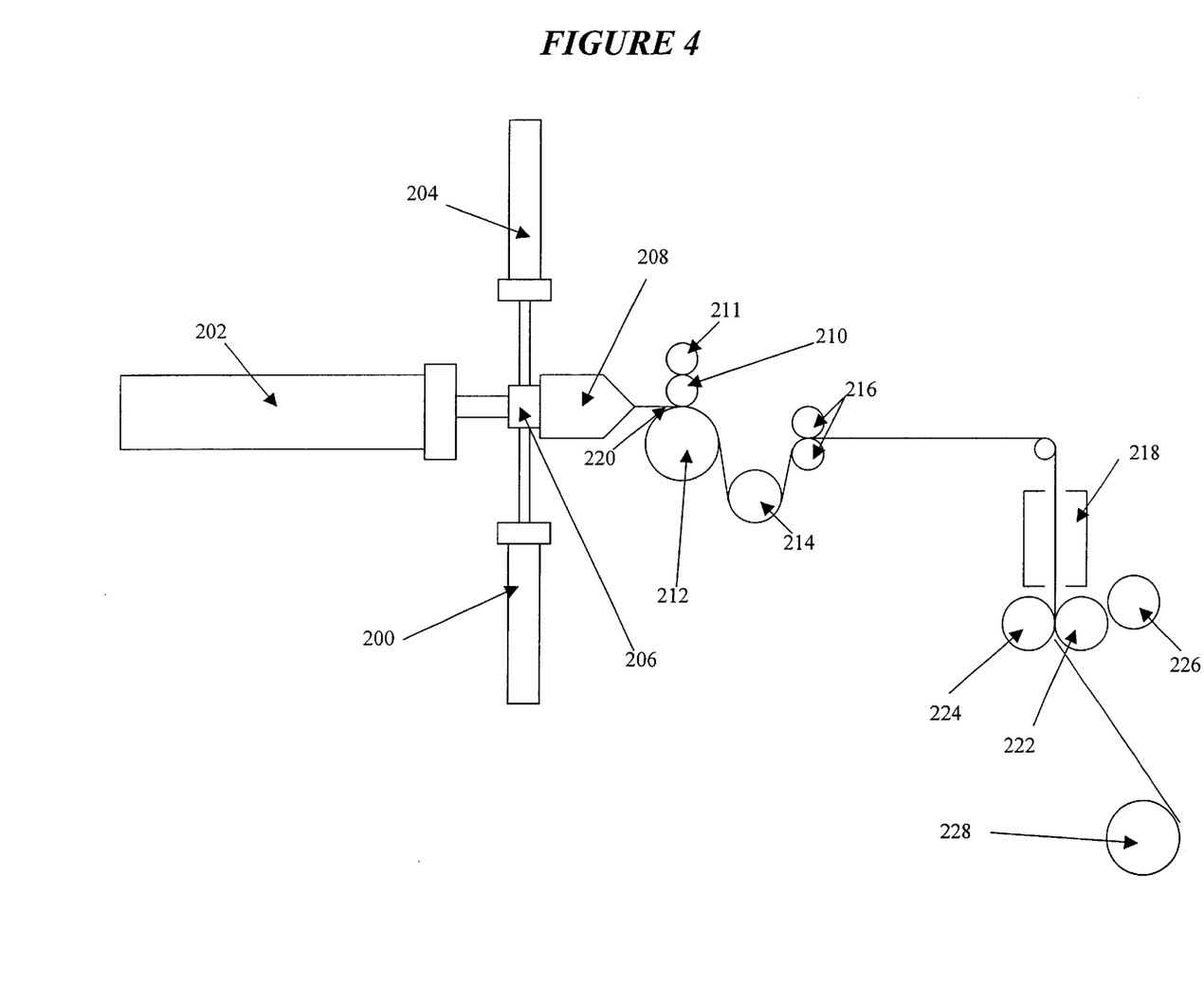
FIG. 4 is a flow-sheet-illustrating an extrusion process for making high gloss multilayered thermoplastic film, wherein the process includes an additional heating and rolling step, also known as post embossing.

In one embodiment of the present invention, the high gloss thermoplastic film is embossed so that the film has glossy unembossed areas and embossed areas. The embossed areas may form a predetermined pattern on the glossy side of the extruded film. Examples of embossing methods are described in U.S. Pat. No. 5,693,405 and U.S. Pat. No. 4,234,300, which are hereby incorporated by reference. As illustrated in FIG. 4, the apparatus used in the process for making an embossed multlayered film 12 includes extruders 200, 202 and 204, adapter block 206, extrusion die 208, pinning roll 210, polished casting roll 212, chill roll 214, nip rolls 216, and the take-up reel 228.

The polymeric material for forming skin layer 18 is extruded from extruder 200 and then advanced to adapter block 206 and extrusion die 208. The polymeric material for forming core layer 16 is extruded from extruder 202 and then advanced to adapter block 206 and extrusion die 208. The polymeric material for forming skin layer 20 is extruded from extruder 204 and then advanced to adapter block 206 and extrusion die 208. In extrusion die 208, the polymeric materials are combined to form the molten multilayered film 12. The molten multilayered film 12 is advanced from the extrusion die 208, to the nip 220 formed between the casting roll 212 and the pinning roll 210, over casting roll 212, under chill roll 214, through tension rolls 216 through radiant heater 218 and between embossing roll 224 and second pinning roll 222 to take up reel 228 where it is wound to provide multilayered film 12 in roll form. Rider roll 211 acts to cool the surface of pinning roll 210 and rider roll 226 acts to cool the surface of second pinning roll 222. Embossing roll 224 preferably comprises an elastomeric or rubber type material that has an outer surface which defines an embossed or three-dimensional texture. The outer surface of the embossing roll also defines a plurality of openings or interruptions arranged in a predetermined pattern on the outer surface. The predetermined pattern formed by the interruptions or openings can comprise written words, artistic works, trademark or other brand identification. Skin layer 18 is provided with the predetermined pattern upon passing through the nip area formed between the embossing roll and the second pinning roll.

In another embodiment, the high gloss thermoplastic film is further processed to increase the gloss and/or DOI of the skin layer 18. This embodiment is similar to the embossing operation illustrated in FIG. 4, with the exception that the embossing roll 224 is replaced with a second, highly polished roll. In this embodiment, the thermoplastic film exits the tension rolls 216 and then passes through radiant heater 218 and between second pinning roll 222 and a second highly polished roll to take up reel 228 where it is wound to provide multilayered film 12 in roll form. The second, highly polished roll may be constructed of the same materials as the casting roll 212. In reheating the film, the stresses which were built into the film in the cast extrusion process are relieved. In addition, any surface imperfections related to outgassing of degraded antioxidant or to trapped moisture can be eliminated. Pits in the film surface, caused by the entrapment of evaporating moisture from the molten extrudate and the casting roll, can be smoothed out by reheating and rolling the softened film between the second highly polished roll and the second pinning roll. A film having an even higher gloss and higher DOI finish can be obtained with this embodiment. The second, highly polished roll has a surface roughness of no more than $R_a$=0.025 microinches. Preferably, the highly polished roll has a surface roughness of no more than $R_a$=0.0125 microinches.

As described above, the present invention relates to computer graphics films and multilayer thermoplastic films. The films are characterized as having a core layer which is composed of at least one polyolefin. In another embodiment, the core further comprises one or more of a light stabilizer, a pigment, one or more other thermoplastic polymers or processing additives, the details of which are discussed below. The films of the present invention also include at least one skin layer on the core. The skin layers may be directly in contact with the core or may be attached to the core through tie or intermediate layers. At least one skin layer is abrasive resistant. In one aspect, the abrasive resistant layer is the first skin layer and may be clear or pigmented, preferably clear. This layer may be prepared from blends of polymers and include one or more of light stabilizers, pigments or processing chemicals, the details of which are described herein. The second skin may be clear or pigmented. The second skin may be prepared from a blend of polymers and may also include one of more of light stabilizers, processing chemicals or pigments, which are described herein. The multilayer film may be oriented or unoriented, preferably unoriented. The skin and core may be independently oriented or unoriented, preferably unoriented. The materials used to make the films of the present invention, in one embodiment, are selected to provide the physical characteristics necessary for signage. In other words, the materials must provide effective physical characteristics to provide the needed strength to withstand the cutting process and weatherability for sign applications.

In a preferred embodiment, the inventive multilayered films are characterized by a combination of features. These include the composition of the core layer being characterized by the combination of a polyolefin having a density in the range of about 0.89 to about 0.97 grams per cubic centimeter, and in a most preferred embodiment, a second thermoplastic polymeric material selected from ethylene-unsaturated carboxylic acid or anhydride, such as ethylene-acrylic acid copolymers, ethylene-methacrylic acid copolymers, and ionomers derived from sodium, lithium or zinc and an ethylene/unsaturated acid or anhydride, such as an ethylene/methacrylic acid copolymer, and combinations thereof, the concentration of the second thermoplastic polymeric material being from about 1% to about 25% preferably from about 2% to about 10% by weight based on the weight of the core layer. This combination of polyolefin and a second polymeric material significantly improves the appearance of the film. This combination is particularly advantageous when dark colors (e.g., dark blue, black, etc.) are desired. For example, in one embodiment, a film with a charcoal gray appearance is produced when only the polyolefin is used, but when the polyolefin is combined with the second polymeric material as indicated above, a deep black color is achieved. It is recognized that the polymer blend is useful in some applications where color is important to the end-user. There are some applications where this is not the case, and the composition of the core need not be a copolymer blend.

In one embodiment, the core layer and each of the skin layers are characterized by relatively high concentrations of light stabilizers. In this regard, the core layer has a light stabilizer concentration of about 1,000 to about 10,000 ppm or from about 2500 to about 8000, the first skin layer has a light stabilizer concentration of about 2,000 to about 20,000 ppm or from about 5000 to about 16,000, and the second skin layer has a light stabilizer concentration of about 1,000 to 15,000, from about 3,000 to about 12,000 ppm. The use of such high levels of light stabilizers provides the inventive multilayered films with outdoor weatherability properties comparable to and in some instances superior to those of the PVC films used in the prior art.

In a most preferred embodiment, there is at least one skin layer and that layer is clear. More typically however, there are generally two skin layers. This enhances the economics of using the inventive multilayered film when the core layer is pigmented due to the fact that the time involved with changing from one color to another during extrusion of the multilayered film is significantly reduced. While not wishing to be bound by theory, it is believed that this advantage is realized because pigment in extruded polymer compositions tends to adhere to the internal metal parts of the extruder die and other extrusion apparatus downstream of the extruder, and the use of the clear skin layers of the invention prevents or limits contact between the pigmented core layer and the internal metal parts of the foregoing extrusion equipment.

The first skin layer and, optionally, the second skin layer, of the inventive multilayered film is characterized by the use of an abrasion and scuff resistant polymer. This feature not only provides the inventive multilayered film with enhanced abrasion and scuff resistance properties, but also provides the film with excellent sign cutting and weeding properties.

The inventive multilayered film is characterized by the absence of PVC. The overall composition of the core layer is different than the overall composition of the skin layers.

The inventors have found that the foregoing combination of features provides the inventive multilayered films with properties that make them equivalent to or superior to the PVC films used in the prior art, and yet allows for the use of films that avoid the problems involved with the use of such PVC films. In addition, the multilayered films of the present invention do not possess the inconsistent appearance of the multilayered films which are pinned to a casting roll with an air knife. The gloss is consistent across the surface of the multilayered films of this invention and the protruding gels typically seen in air knife pinned film are generally not seen in the multilayered films of this invention.

Figure 2:
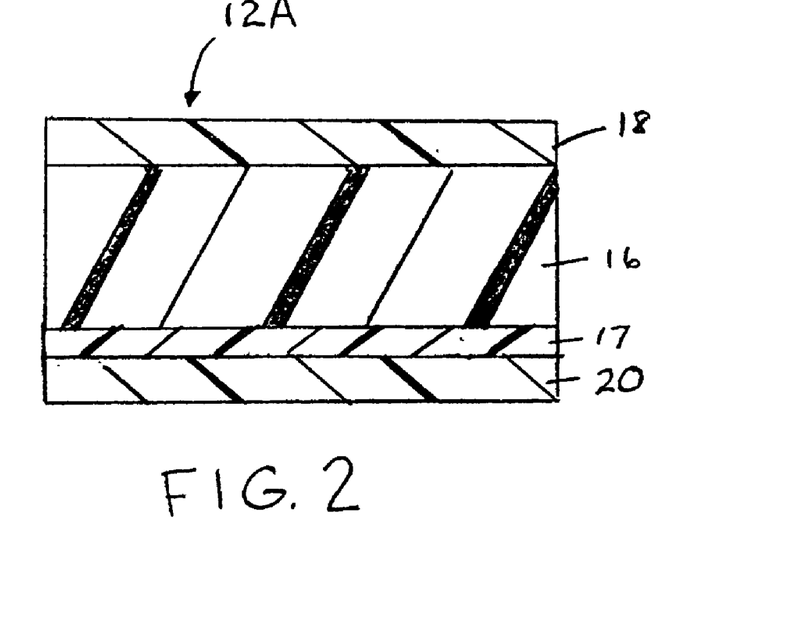
FIG. 2. is a schematic illustration of the side view of a multilayered thermoplastic film embodying the present invention in another particular form, the film comprising a thermoplastic core layer having a first side and a second side, an abrasion resistant first thermoplastic skin layer overlying the first side of core layer, an intermediate layer overlying the second side of the core layer, and a second thermoplastic skin layer overlying the intermediate layer.

Useful embodiments of the inventive multilayered film are depicted in FIGS. 1 and 2. Referring to FIG. 1, multilayered film 12 has a thermoplastic core layer 16, which has a first side and a second side, an abrasion and scuff resistant clear first thermoplastic skin layer 18 overlying the first side of the core layer 16, and a clear second thermoplastic skin layer 20 overlying the second side of the core layer 16. Skins 18 and 20 may also be pigmented.

Referring to FIG. 2, multilayered film 12A has a thermoplastic core layer 16, which has a first side and a second side, an intermediate layer 17 overlying to the second side of the core layer 16, an abrasion and scuff resistant clear first thermoplastic skin layer 18 overlying the first side of the core layer 16, and a clear second thermoplastic skin layer 20 overlying the intermediate layer 17. Skins 18 and 20 may also be pigmented. The intermediate layer may be a stiffening layer. The stiffening layer is composed of a thermoplastic polymer, such as the polyolefins described herein (e.g. polyethylene, polypropylene, or an ethylene, propylene copolymer). The intermediate layer may be an adhesive layer as well. The intermediate layer may be composed of reground core polymers which include pigments. As an alternative, the intermediate layer may also be an opacifying layer. The opacifying layer contains materials which increase the opacity of the multilayer film.

The core layer 16 is comprised of at least one thermoplastic polymer, which is discussed below. The core layer may be composed of a single thermoplastic polymer or a blend a thermoplastic polymer with either a second thermoplastic polymer or an adhesive. The core may also be composed of a thermoplastic polymer, a second thermoplastic polymer and an adhesive. Of course it is understood that the core may have other processing components and stabilizing components as is discussed below.

In one embodiment, the core layer 16 is comprised of a combination of thermoplastic polymers. This combination is comprised of: a polyolefin having a density in the range of about 0.89 to about 0.97 g/cc, and in one embodiment about 0.915 to about 0.97 g/cc, and in one embodiment about 0.926 to about 0.945 g/cc. In a preferred embodiment of the invention, the core includes a second thermoplastic polymeric material selected from ethylene-unsaturated carboxylic acid or anhydride such as ethylene-acrylic acid copolymers, or ethylene-methacrylic acid copolymers, ionomers derived from sodium, lithium or zinc and ethylene-unsaturated carboxylic acid or anhydride such as ethylene/methacrylic acid copolymers, and combinations of two or more thereof. The concentration of the second thermoplastic polymeric material is critical and is in the range of about 2% to about 25% by weight based on the weight of the core layer 16. In one embodiment, the concentration of the second thermoplastic polymer is from about 2% to about 22% by weight, and in one embodiment about 3% to about 20% by weight, and in one embodiment about 3% to about 10% by weight based on the weight of the core layer 16. The combined weight of the polyolefin and second thermoplastic polymeric material is at least about 60% by weight based on the weight of the core layer 16, and in one embodiment about 60% to about 95% by weight, and in one embodiment about 70% to about 95% by weight based on the weight of the core layer 16.

The polyolefins that are useful in the core include polyethylene, polypropylene or polybutylene or copolymers of ethylene, propylene or butylene with an alpha olefin. The alpha olefin, is selected from those alpha olefins containing from 3 to about 18 carbon atoms, and in one embodiment 2 to about 12 carbon atoms, and in one embodiment, 3 to about 8 carbon atoms, including propylene, ethylene, butene, butylene, hexene, 4-methylpentene and octene. The polyolefin core may be made by a blend of polyolefins such as a polyethylene and an ethylene propylene copolymer. Medium density polyethylenes and the linear medium density polyethylenes are useful. Useful polyolefins include those prepared using a Ziegler-Natta catalyst or a metallocene catalyst. An example of a useful polyolefin is available from Huntsman Products under the trade designation 1080, which is identified as a polyethylene having a density of 0.93 g/cc. Affinity 1030HF, which is a product of Dow Chemical identified as a metallocene catalyst catalyzed octene-ethylene copolymer can also be used. Dowlex 2036A which is a product of Dow identified as linear medium density polyethylene can be used. Quantum 285-003, which is a product of Millenium. Petrochemical identified as a polyethylene resin having a density of 0.93 grams per cubic centimeter can be used.

As described above, the core layer may include a second thermoplastic material selected from ethylene-unsaturated carboxylic acid or anhydride copolymers, ionomers derived from sodium, lithium or zinc and ethylene/unsaturated carboxylic acid or anhydride copolymers, and combinations of two or more thereof. The ionomer resins available from DuPont under the tradename Surlyn can be used. These resins are identified as being derived from sodium, lithium or zinc and copolymers of ethylene and methacrylic acid. Included in this group are: the sodium containing ionomers available under the Surlyn name and the following designations: 1601, 1605, 1707, 1802, 1901, AD-8548, 8020, 8140, 8528, 8550, 8660, 8920 and 8940. Also included are the zinc containing ionomers available under the Surlyn name and following designations: 1650, 1652, 1702, 1705-1, 1855, 1857, AD-8547, 9120, 9650, 9730, 9910, 9950 and 9970. The lithium containing ionomers available under the Surlyn name and the following designations are also useful: AD-8546, 7930 and 7940.

The ethylene/methacrylic acid copolymers that are useful include those available from DuPont under the tradename Nucrel. These include Nucrel 0407, which has a methacrylic acid content of 4% by weight and a melting point of 109° C., and Nucrel 0910, which has a methacrylic acid content of 8.7% by weight and a melting point of 100° C.

The ethylene/acrylic acid copolymers that are useful include those available from Dow Chemical under the tradename Primacor. These include Primacor 1430, which has an acrylic acid monomer content of 9.5% by weight and a melting point of 97° C.

The core layer 16 can be pigmented or it can be clear. A clear core layer is one that can be seen through. Preferably, the core layer is pigmented. The pigment can be a metallic pigment, heavy metal-based pigment, a heavy-metal free pigment, or an organic pigment. A heavy metal is defined herein as being lead, cadmium, chromium, or antimony. The pigments that can be used include titanium dioxide, both rutile and anatase crystal structure. The titanium dioxide may be coated or uncoated (e.g. aluminum oxide coated $TiO_2$).

In one embodiment, the pigment is added to the core layer material in the form of a concentrate containing the pigment and a resin carrier. The concentrate may contain, for example, about 20% to about 80% by weight pigment, and about 20% to about 80% by weight resin carrier. The resin carrier can be any thermoplastic polymer having a melting point in the range of about 100° C. to about 175° C. Examples include polyethylene, polypropylene, polybutylene, and the like. In one embodiment, a titanium dioxide concentrate is used which is comprised of a blend of about 30% to about 70% by weight polypropylene and about 70% to about 30% by weight titanium dioxide. An example of a commercially available pigment concentrate that can be used is available from A. Schulman Inc. under the tradename Polybatch White P8555 SD, which is identified as a white color concentrate having a coated rutile titanium dioxide concentration of 50% by weight in a polypropylene homopolymer carrier resin. Ampacet 150380, which is a product of Ampacet Corporation identified as a red pigment concentrate, can be used. Ampacet 190303, which is a product of Ampacet Corporation identified as a black pigment concentrate, can be used. Ampacet LR-87132 Orange PE MB, which is a product of Ampacet Corporation identified as a lead molybdate/lead chromate pigment concentrate, can be used. The heavy-metal free pigment concentrates that can be used include Ampacet LR-86813 Yellow UV PE MB, Ampacet LR-86810 Red PE MB, Ampacet LR-86816 Orange PE MB, and Ampacet LR-86789 Red UV PE MB. The concentration of pigment in the core layer can be up to about 25% by weight, and in one embodiment about 5% to about 25% by weight, and in one embodiment about 10% to about 20% by weight.

As indicated above, the multilayered film 12 or 12A is useful in sign applications and a critical feature of this invention is that the skin layer 18 be abrasion and scuff resistant. Also, in one embodiment, the skin layer 20 is abrasion and scuff resistant. The type of abrading and scuffing that is of concern is the abrading and scuffing that occurs when the film is applied to a substrate. In one embodiment of the invention, the film is applied with a rubber or plastic applicator which is rubbed against the film surface to smooth out the edges or remove air bubbles trapped between the film and substrate. The air is squeezed out from underneath the film by forcing the bubble of air to the edge. This tends to abrade and/or scuff the film surface leaving an objectionable appearance. Abrasion and scuff resistance can be measured using ASTM D4060-84. For purposes of this invention, a film surface that is "abrasion and scuff resistant" is a film surface that has a 60° gloss reduction of 20 points or less when tested in accordance with ASTM D4060-84 using a No. CS-10 wheel and a 250 gram load after 5 cycles of rotation. In one embodiment of the present invention, the high gloss skin layer is abrasion and scuff resistant.

The skin layer 18 may be clear or pigmented, preferably clear. The term "clear" is used herein to refer to the fact that the skin layer 18 can be seen through. "Clear" films are those through which graphics may be read. When pigmented, the skin layer may contain one or more of the pigments described herein. The skin layer 18 is comprised of any thermoplastic polymer abrasion and scuff resistant as indicated above. In one embodiment, the skin layer is comprised of an ethylene-acrylic acid copolymer, ethylene-methacrylic acid copolymer, an ionomer derived from sodium, lithium or zinc and an ethylene/methacrylic acid copolymer, or a combination thereof. Any of the ethylene acrylic or methacrylic acid copolymers or ionomers described above as being useful in making the core layer 16 can be used. These copolymers and ionomers that are useful include the ionomers available from DuPont under the tradename Surlyn, the ethylene/methacrylic acid copolymers available form DuPont under the tradename Nucrel, and the ethylene/acrylic acid copolymers available from Dow Chemical under the tradename Primacor. Because Surlyn is hydroscopic, the thermoplastic film containing Surlyn in skin layer 18 is preferably reheated and rolled between the second polished roll and the second pinning roll as previously described herein. With this subsequent heating and rolling step, the moisture level of skin layer 18 is lowered and the appearance of skin layer 18 is improved.

The concentration of the foregoing thermoplastic polymers in the skin layer 18 is generally at least about 45%, or at least about 60% by weight, based on the overall weight of the skin layer 18, and in one embodiment at least about 75% by weight, and in one embodiment about 75% to about 98% by weight, and in one embodiment about 80% to about 95% by weight. The skin layer may also include one or more of the above described polyolefins such as polyethylene, polypropylene, or an ethylene-propylene copolymer. Typically, the polyolefin is present in a minor amount such as an amount from about 3% to about 40%, or from about 5% to about 25%.

The skin layer 20 is clear or pigmented and may be comprised of any of the thermoplastic polymers discussed above as being useful in making the core layer 16 or skin layer 18. The term "clear" is used herein to refer to the fact that the skin layer 20 can be seen through. When pigmented, the skin layer may contain one or more of the above pigments described herein. In one embodiment, the skin layer 20 is abrasion and scuff resistant. The skin layer 20 may be comprised of a thermoplastic copolymer or terpolymer derived from ethylene or propylene and a functional monomer selected from the group consisting of acrylic acid, alkyl acrylic acid, and combinations of two or more thereof. The alkyl groups in the alkyl acrylic acids typically contain 1 to about 8 carbon atoms, and in one embodiment 1 to about 2 carbon atoms. The functional monomer(s) component of the copolymer or terpolymer ranges from about 1 to about 15 mole percent, and in one embodiment about 1 to 10 mole percent of the copolymer or terpolymer molecule. Examples include: ethylene/methacrylic acid copolymers; ethylene/acrylic acid copolymers; ethylene/methacrylic acid copolymers containing sodium, lithium or zinc (also referred to as ionomers); and mixtures of two or more thereof. The composition of the skin layers 18 and 20 can be the same as each other or they can be different. The concentration of the foregoing thermoplastic polymers in the skin layer 20 is generally at least about 50% by weight, and in one embodiment at least about 60% by weight, and in one embodiment about 60% to about 97% by weight, and in one embodiment about 70% to about 95% by weight. The skin layer may also include one or more of the above described polyolefins such as polyethylene, polypropylene, or an ethylene-propylene copolymer. Typically, the polyolefin is present in a minor amount such as an amount from about 3% to about 40%, or from about 5% to about 25%.

In another embodiment, skin layer 20 is an adhesive skin layer. The adhesive skin layer comprises adhesive polymers such those described below and including ethylene vinyl acetate copolymers. The skin layer 20 may also be a blend of an adhesive polymer and a polyolefin or one of the second thermoplastic polymers described above. In one embodiment, the adhesive skin layer includes a blend of polyolefin and an adhesive polymer. The polyolefin is typically present in an amount from about 50% up to about 95%, or from about 65% up to about 85% by weight. The adhesive polymer is present in an amount from about 5% up to about 45%, or from about 15% to about 35% by weight.

The core layer 16 and skin layers 18 and 20 may contain relatively high concentrations of light stabilizers such as ultraviolet (UV) light absorbers and/or other light stabilizers. These additives are included to provide the inventive films with enhanced outdoor weatherability properties. The concentration of these light stabilizers in the core layer 16 is in the range of about 1,000 to about 10,000 ppm based on the weight of core layer 16, and in one embodiment from about 2,000 to about 10,000 ppm, and in one embodiment about 3,000 to about 8,000 ppm. The concentration of light stabilizer in the skin layer 18 is in the range of about 2,000 to about 20,000 ppm based on the weight of skin layer 18, and in one embodiment from about 5,000 to about 20,000 ppm, and in one embodiment from about 8,000 to about 18,000 ppm. The concentration of the light stabilizer in the second skin layer 20 is in the range of about 1,000 to about 15,000 ppm based on the weight of the skin layer 20, and in one embodiment about 3,000 to about 15,000 ppm, and in one embodiment about 5,000 to about 12,000 ppm.

Useful light stabilizers include the hindered amine light stabilizers. Hindered amine light stabilizers are described in the literature such as in U.S. Pat. No. 4,721,531, columns 4 to 9, which is incorporated herein by reference. The hindered amine light stabilizers may, for example, be derivatives of 2,2,6,6-tetraalkyl piperidines or substituted piperizinediones. A number of hindered amine light stabilizers useful in the invention are available commercially such as from Ciba-Geigy Corporation under the general trade designations "Tinuvin" and "Chemissorb", and from Cytec under the general designation "Cyasorb-UV." Examples include Tinuvin 783 which is identified as a mixture of poly [[60 [(1,1,3,3,-tetramethylbutyl)amino]-1,3,5-triazine-2,4-diyl] [[2,2,6,6-tetramethyl-4-piperidyl)imino]hexamethylene [(2, 2,6,6-tetramethyl-4-piperidyl)imino]] and dimethyl succinate polymer with 4-hydroxy-2,2,6,6-tetramethyl-1-piperidineethanol; Tinuvin 770 which is identified as bis-(2, 2,6,6-tetramethyl-4-piperidinyl)-sebacate; Tinuvin 765 which is identified as bis-(1,2,2,6,6-pentamethyl-4-piperidinyl)-sebacate; Tinuvin 622 which is a polyester of succinic acid and N-beta-hydroxy ethyl-2,2,6,6-tetramethyl-4-hydroxy-piperidine; and Chemissorb 944 which is poly [6-(1,1,3,3-tetramethylbutyl)amino]-s-triazine-2,4-diy[[2,2, 6,6-tetramethyl-4-piperidyl)imino]hexamethylene (2,2,6,6-tetramethyl-4-piperidyl)imino]. A useful stabilizer is available under the tradename Ampacet 10561 which is a product of Ampacet identified as a UV stabilizer concentrate containing 20% by weight of a UV stabilizer and 80% by weight of a low density polyethylene carrier resin; the UV stabilizer in this product is Chemissorb 944. Useful light stabilizers are also provided in Ampacet 150380 and Ampacet 190303, both of which are pigment concentrates discussed above. Ampacet 150380 has a UV stabilizer concentration of 7.5% by weight. Ampacet 190303 has a UV stabilizer concentration of 4% by weight. The UV stabilizer in each of these products is Chemissorb 944. Ampacet LR-89933 is a gray concentrate having a UV stabilizer concentration of 4.5% by weight, the UV stabilizer being Tinuvin 783.

The skin layers 18 and 20 may contain antiblock and/or slip additives. These additives reduce the tendency of the film to stick together when it is in roll form. The antiblock additives include natural silica, diatomaceous earth, synthetic silica, glass spheres, ceramic particles, etc. The antiblock content of the skin layer 18 should not exceed about 1500 ppm. Above this level, the gloss of the skin layer is adversely affected. The slip additives include primary amides such as stearamide, behenamide, oleamide, erucamide, and the like; secondary amides such as stearyl erucamide, erucyl erucamide, oleyl palimitamide, stearyl stearamide, erucyl stearamide, and the like; ethylene bisamides such as N,N-ethylenebisstearamide, N,N-ethylenebisolamide and the like; and combinations of any two or more of the foregoing amides. An example of a useful slip additive is available from Ampacet under the trade designation 10061; this product is identified as a concentrate containing 6% by weight of a stearamide slip additive. The antiblock and slip additives may be added together in the form of a resin concentrate. An example of such a concentrate is available from DuPont under the tradename Elvax CE9619-1. This resin concentrate contains 20% by weight silica, 7% by weight of an amide slip additive, and 73% by weight of Elvax 3170 (a product of DuPont identified as an ethylene/vinyl acetate copolymer having a vinyl acetate content of 18% by weight). The antiblock additive can be used at a concentration in the range of up to about 1% by weight, and in one embodiment about 0.01% to about 0.5% by weight. The slip additive can be used at a concentration in the range of up to about 1% by weight, and in one embodiment about 0.01% to about 0.5% by weight.

Another use for slip additives is to impart scuff resistance to the top skin layer (18) surface. Depending upon how these materials are incorporated in skin layer 18 these materials will migrate to the surface through incorporation in the body of layer 18 or can be applied to the top. The slip can be incorporated in skin layer 18 by polyethylene concentrate form or by direct feeding of these additives through ports in the skin extruder.

Often the abrasive resistant polymer will develop a static charge during processing. This charge may collect dust on the surface which is objectionable since sign applications require a clean surface. The charge may be minimized by incorporation of an antistatic materials to the skin layer. The antistatic agents may be added as the concentrate containing 5% of the antistatic agent in a polyethylene concentrate. The concentrate is typically used at a level of 6%. The antistatic agent is typically present in an amount from about 100 ppm to about 15,000 ppm, or about 25,000 ppm to about 10,000 ppm or from about 3,000 to about 6,000 ppm. A preferred antistatic agent is glycerol monoleate. Other useful antistatic agents include alkoxylated amines or amides, such as ethoxylated amines or ethoxylated amides.

The core layer 16 may contain a minor amount of an adhesive resin to enhance the adhesion of the skin layers 18 and 20 to the core layer 16. Also, or alternatively, tie layers of an adhesive resin can be positioned between the core layer 16 and either or both of the skin layers 18 and 20 for enhancing adhesion. The adhesive resin can be an ethylene/vinyl acetate copolymer. These include the ethylene/vinyl acetate copolymers available from DuPont under the trade designation Elvax. Examples include Elvax 3170 and 3190LG. The adhesive resins available from DuPont under the tradename Bynel can also be used. These include ethylene/vinyl acetate resins available under the trade designation Series 1100, acid-modified ethylene acrylate polymers (Series 2000), anhydride-modified ethylene acrylate copolymers (Series 2100), anhydride-modified ethylene/vinyl acetate copolymers (Series 3000), acid- and acrylate-modified ethylene/vinyl acetate resins (Series 3100), anhydride-modified ethylene/vinyl acetate copolymers (Series 3800), anhydride-modified ethylene/vinyl acetate resins (Series 3900), anhydride-modified high density polyethylene resins (Series 4000), anhydride-modified linear low density polyethylene resins (Series 4100), anhydride modified low density polyethylene resins (Series 4200), and anhydride modified polypropylene resins (Series 5000). Bynel CXA 1123 and Bynel CXA 3101 are specific examples. When included in the core layer, the adhesive resin is used at a concentration of up to about 45%, or up to about 25% by weight, and in one embodiment about 1% to about 15% by weight. In another embodiment, the adhesive resin is present in an amount from about 20% to about 40%, or from about 25% to about 35% by weight. When used in the form of film layers between the core layer and the skin layers, each of such adhesive resin film layers has a thickness of about 5% to about 25% of the thickness of the multilayer film, and in one embodiment about 10% to about 20%. In one embodiment, the adhesive layer has a thickness of about 0.1 to about 0.5, or from about 0.2 to about 0.4 mil.

In one embodiment, the core layer 16 and/or skin layers 18 and 20 contain an effective amount of a processing aid to facilitate extrusion. While not wishing to be bound by theory, it is believed that these processing aids have a high affinity to metal surfaces and thereby prevent or reduce the tendency of the polymer compositions being extruded from adhering to the inner walls of the extrusion equipment. This makes it easier to purge the extrusion equipment during color changeovers. These processing aids include hexafluorocarbon polymers. An example of a commercially available processing aid that can be used is Ampacet 10919 which is a product of Ampacet Corporation identified as a hexafluoro carbon polymer. The processing aids are typically used at concentrations of up to about 0.25% by weight, and in one embodiment about 0.03% to about 0.15% by weight.

As indicated above, one embodiment of the invention (FIG. 2) involves providing a intermediate layer 17 between the core layer 16 and the skin layer 20. The intermediate layer 17 may be comprised of the same materials as the core layer 16, skin layer 18 and/or skin layer 20. In one embodiment, scrap or trim material produced during the process for making these multilayered films can be recycled as the intermediate layer material. An example of a polyolefin that can be used in the intermediate layer is the polyethylene resin supplied by Huntsman under the trade designation 1080. In one embodiment, the intermediate layer 17 is pigmented so as to be white, black or gray in color. That is, the pigments used in this intermediate layer 17 are white, black, or a suitable mixture of white and black to provide a desired shade of gray. In this embodiment, the core layer 16 may contain a colored pigment (e.g., red, blue, yellow, etc). This combination enhances the opacity of the inventive multilayered film and provides the film with deeper and richer colors. With this embodiment, it is of particular advantage to use heavy-metal free pigments in both the core layer and the intermediate layer. Examples of commercially available heavy-metal free pigments or organic pigments that can be used include Ampacet LR-86789 which is a red pigmented polyethylene resin concentrate, Ampacet 190303 which is a black pigmented polyethylene resin concentrate, Ampacet LR-89933 which is a gray concentrate, and Ampacet 110235 which is a white pigmented polyethylene concentrate. The intermediate layer 17, when used, typically has a thickness of about 5% to about 25%, and in one embodiment about 10% to about 15% of the overall thickness of the multilayered film 12A.

In one embodiment, a clear topcoat layer overlies skin layer 18. A topcoat layer may be added to any of the multilayer films described herein. The topcoat layer is applied to the first skin layer and may directly applied or attached through one or more tie or adhesive (such as the pressure sensitive adhesive described herein) coats. The topcoat layer is used to provide the inventive multilayered film with enhanced abrasion and scuff resistant properties and, in one embodiment, enhanced gloss characteristics. The topcoat preferably has a thickness from about 2 to about 6, or from about 3 to about 5 microns. The topcoat layer is made from a thermoplastic polymer composition, the polymer being an ester, urethane, epoxy, phenoxy, acrylic, or a combination of two or more thereof. The polymer can be a radiation curable polymer, with UV curable epoxy, acrylic, ester, urethane and phenoxy resins being especially useful. The polymer can be a heat curable resin with urethane and acrylic resins being especially useful. The polymer composition may contain diluents (e.g., vinyl ether, limonene dioxide, epoxy oligomers, glycidyl ether), wetting agents or surfactants which are used to provide a uniform flow resulting in an even topcoating layer, waxes, slip aids, light stabilizers, and the like. Use of at least one of the foregoing light stabilizers discussed above is critical and any of the light stabilizers discussed above can be used. The concentration of these light stabilizers is in the range of about 500 about 20,000 ppm, and in one embodiment about 1,000 to about 12,000 ppm, and in one embodiment about 2,000 to about 8,000 ppm. The thickness of the topcoat layer is generally from about 1 to about 12 microns, and in one embodiment from about 3 to about 6 microns. An example of an acrylic resin based topcoat formulation that can be used is as follows:

| Tradename | Supplier | Description | Weight % |
| --- | --- | --- | --- |
| Rhoplex B15P | Rohm & Haas | Acrylic Resin | 93.9% |
| CX 100 | Zeneca Resins | Polyaziridine Crosslinker | 3.0% |
| Disperbyk 182 | Byk Chemie | Wetting Agent | 1.0% |
| DF-75 | Air Products | Defoamer | 0.1% |
| Synflow 178XF | Micro Powders | Wax/Mar Additive | 2.0% |

An example of an UV curable epoxy resin based topcoat formulation that can be used is as follows:

| Tradename | Supplier | Description | Weight % |
| --- | --- | --- | --- |
| Cyracure UVR-6110 | Union Carbide | Epoxy Resin | 83.5% |
| Tone 301 | Union Carbide | Caprolactone Polyol | 10.0% |
| Cyracrure UVI-6974 | Union Carbide | Photoinitiator | 6.0% |
| Silivet L7604 | OSI | Wetting Agent | 0.5% |

An example a UV curable urethane based topcoat formulation is as follows:

| Tradename | Supplier | Description | Weight % |
| --- | --- | --- | --- |
| CN 963B80 | Sartomer | urethane acrylate (aliphatic) | 75% |
| SR 238 | Sartomer | 1,6 hexanediol | 20.5% |
| Irgacure 184 | Ciba | photoinitiator | 3% |
| Tinuvin 1130 | Ciba | UV Stabilizer | 1% |
| Tinuvin 123 | Ciba | UV Stabilizer | 0.5% |

In one embodiment, the topcoat provides the ability to print by any method, such as with electrostatic and thermal transfer printing. The topcoat may be any of the topcoats described herein. Preferably the topcoat is a thermoplastic polyurethane. The printing topcoat is preferably applied at a coat weight of about 5 to about 9, or from about 6 to about 8 gsm. An example of a topcoat for printing is as follows:

| Tradename | Supplier | Description | Weight % |
|---|---|---|---|
| Irostic 9827 | Morton Chemical | thermoplastic polyurethane | 12% |
| — | — | Methyl, Ethyl Ketone | 38% |
| Irganox 1010 | Ciba | Antioxidant | 0.25% |
| Tinuvin 292 | Ciba | UV Stabilizer | 0.125% |
| Tinuvin 328 | Ciba | UV Stabilizer | 0.125% |
| — | — | Toluene | 25.5% |
| — | — | Isopropyl alcohol | 24% |

This topcoat is prepared by blending the polyurethane with the ketone to make a first blend which is then mixed with a concentrate prepared from the antioxidant and UV stabilizers. Toluene and isopropyl alcohol are added to the mixture and the mixture is filtered.

The topcoat layer can be applied to the skin layer 18 using known techniques, including multi roll coating, reverse roll coating, blade coating, air knife coating, gravure coating, etc.

In one embodiment, the core layer 16, intermediate layer 17, and each of the skin layers 18 and 20, and topcoat layer are characterized by the absence of polyvinyl chloride (PVC).

In another embodiment, and as illustrated by FIG. 2, a multilayer film has core layer 16, abrasive resistant skin layer 18, and intermediate layer 17 which is in contact with an adhesive or adhesive skin layer 20. The core is composed of those polymers described above. In one embodiment, skin layer 18 and immediate layer 17 have the same composition. In another embodiment, intermediate layer 17 is a stiffness adding layer such as one or more of the above polyolefins or second thermoplastic materials described above. Intermediate layer 17, in one embodiment, has a thickness of about 0.05 to about 1.5 mil, preferably from about 0.1 mil to about 1 mil, or from about 0.15 mil to about 0.65 mil. Applicants have discovered by the inclusion of this intermediate layer, stiffness of the film is improved.

The multilayered thermoplastic films 12 (FIG. 1) and 12A (FIG. 2) may have an overall thickness ranging from about 1 to about 10 mils, and in one embodiment about 1 to about 8 mils, and in one embodiment about 1 to about 5 mils, and in one embodiment about 2 to about 5 mils, and in one embodiment about 2 to about 4 mils, and in one embodiment about 3 mils. The thickness of the core layer 16 may range from about 10% to about 90% of the overall thickness of the multilayered film, and in one embodiment from about 20% to about 80%. In one embodiment, the thickness of the skin/core/skin layers is 10%/80%/10%, and in one embodiment it is 20%/60%/20%. The skin layers 18 and 20 may be of the same thickness or they may have different thicknesses. Preferably, the skin layers 18 and 20 have the same or substantially the same thickness which allows the multilayered film to lay flat and avoid curl. Similarly, each of the skin layers 18 and 20 may have the same composition or they may have different compositions.

The Pressure Sensitive Adhesive Composite

In one embodiment, the high gloss multilayered thermoplastic film of the present invention is provided as part of a pressure sensitive adhesive composite wherein the multilayered thermoplastic film has a pressure sensitive adhesive laminate adhered to it. The pressure sensitive adhesive laminate is comprised of a layer of a pressure sensitive adhesive adhered to a release liner. The release liner is comprised of a backing liner and a layer of a cured release coating layer adhered the backing liner. The release coating is positioned between the pressure sensitive adhesive and the backing liner. The pressure sensitive adhesive layer is posi- tioned between the second skin layer of the multilayered thermoplastic film and the release coating layer and is preferentially adherent to the second skin layer.

The following examples are provided to further disclose the invention. In these examples as well as throughout the specification and in the claims, unless otherwise indicated, all parts and percentages are by weight.

EXAMPLES

The following Examples 1–6 are multilayered films comprised of core layer 16 and skin layers 18 and 20. The layers are coextruded and then pinned by a silicone rubber pinning roll 110 to casting roll 112.

Table 1 shows the 20° gloss and the 60° gloss as measured by Hunterlab's ProGloss glossmeter (HG) and the 20° gloss and DOI as measured by Analytical Measurement Technology's glossmeter (AMT). The ratio of the machine direction DOI to the cross direction DOI is also shown for Examples 1–6.

Example 1

| | Skin Layer 18: 0.30 mil |
|---|---|
| 91.0% | Surlyn 9120 |
| 7.5% | Ampacet 10561 |
| 1.5% | Ampacet 10919 |
| | Core Layer 16: 2.40 mil |
| 20.0% | Ampacet Black 190303 |
| 49.0% | Huntsman MDPE PE-1080 Resin |
| 5.0% | Surlyn 9120 |
| 1.0% | Ampacet 10919 |
| 22.0% | Equistar EVA (990-35) |
| 3.0% | Ampacet 10561 |
| | Skin Layer 20: 0.30 mil |
| 1.0% | Ampacet 10919 |
| 1.0% | Ampacet 10561 |
| 73.0% | Huntsman MDPE PE-1080 |
| 25.0% | Surlyn 9120 |

Example 2

| | Skin Layer 18: 0.20 mil |
|---|---|
| 89.0% | Surlyn 9120 |
| 7.5% | Ampacet 10561 |
| 1.5% | Ampacet 10919 |
| 2.0% | Ampacet 10061 |
| | Core Layer 16: 2.60 mil |
| 45.0% | Ampacet Cardinal Red 150623 |
| 30.0% | Huntsman MDPE PE-1080 Resin |
| 1.0% | Ampacet 10919 |
| 22.0% | Equistar EVA (990-35) |
| 2.0% | Ampacet 10561 |
| | Skin Layer 20: 0.30 mil |
| 1.5% | Ampacet 10919 |
| 1.5% | Ampacet 10561 |
| 42.0% | Huntsman MDPE PE-1080 |
| 55.0% | Surlyn 9120 |

Example 3

| | Skin Layer 18: 0.20 mil |
|---|---|
| 89.0% | Surlyn 9120 |
| 7.5% | Ampacet 10561 |
| 1.5% | Ampacet 10919 |
| 2.0% | Ampacet 10061 |
| | Core Layer 16: 2.60 mil |
| 45.0% | Ampacet Tomato Red 150624 |
| 30.0% | Huntsman MDPE PE-1080 Resin |
| 1.0% | Ampacet 10919 |
| 22.0% | Equistar EVA (990-35) |
| 2.0% | Ampacet 10561 |
| | Skin Layer 20: 0.30 mil |
| 1.5% | Ampacet 10919 |
| 1.5% | Ampacet 10561 |
| 42.0% | Huntsman MDPE PE-1080 |
| 55.0% | Surlyn 9120 |

Example 4

| | Skin Layer 18: 0.20 mil |
|---|---|
| 89.0% | Surlyn 9120 |
| 7.5% | Ampacet 10561 |
| 1.5% | Ampacet 10919 |
| 2.0% | Ampacet 10061 |
| | Core Layer 16: 2.60 mil |
| 30.0% | Ampacet White 110868 |
| 45.0% | Huntsman MDPE PE-1080 Resin |
| 1.0% | Ampacet 10919 |
| 22.0% | Equistar EVA (990-35) |
| 2.0% | Ampacet 10561 |
| | Skin Layer 20: 0.30 mil |
| 1.5% | Ampacet 10919 |
| 1.5% | Ampacet 10561 |
| 42.0% | Huntsman MDPE PE-1080 |
| 55.0% | Surlyn 9120 |

Example 5

| | Skin Layer 18: 0.20 mil |
|---|---|
| 89.0% | Surlyn 9120 |
| 7.5% | Ampacet 10561 |
| 1.5% | Ampacet 10919 |
| 2.0% | Ampacet 10061 |
| | Core Layer 16: 2.60 mil |
| 18.0% | Ampacet Vivid Blue 160900 |
| 57.0% | Huntsman MDPE PE-1080 Resin |
| 1.0% | Ampacet 10919 |
| 22.0% | Equistar EVA (990-35) |
| 2.0% | Ampacet 10561 |
| | Skin Layer 20: 0.30 mil |
| 1.5% | Ampacet 10919 |
| 1.5% | Ampacet 10561 |
| 42.0% | Huntsman MDPE PE-1080 |
| 55.0% | Surlyn 9120 |

Example 6

| | Skin Layer 18: 0.20 mil |
|---|---|
| 89.0% | Surlyn 9120 |
| 7.5% | Ampacet 10561 |
| 1.5% | Ampacet 10919 |
| 2.0% | Ampacet 10061 |
| | Core Layer 16: 2.60 mil |
| 18.0% | Ampacet Dark Green 170560 |
| 57.0% | Huntsman MDPE PE-1080 Resin |
| 1.0% | Ampacet 10919 |
| 22.0% | Equistar EVA (990-35) |
| 2.0% | Ampacet 10561 |
| | Skin Layer 20: 0.30 mil |
| 1.5% | Ampacet 10919 |
| 1.5% | Ampacet 10561 |
| 42.0% | Huntsman MDPE PE-1080 |
| 55.0% | Surlyn 9120 |

TABLE 1

| | Machine Direction | | | | Cross Direction | | | | DOI |
|---|---|---|---|---|---|---|---|---|---|
| Example | DOI | 60° HG | 20° ATI | 20° HG | DOI | 60° HG | 20° ATI | 20° HG | MD/CD |
| 1 | 67.3 | 89.1 | 63.9 | 69.2 | 56.9 | 89.2 | 61.4 | 69.6 | 1.2 |
| 2 | 65.8 | 88.5 | 67.5 | 71.0 | 58.8 | 89.3 | 63.5 | 71.0 | 1.1 |
| 3 | 62.2 | 86.2 | 61.8 | 72.6 | 50.8 | 87.6 | 64.2 | 65.9 | 1.2 |
| 4 | 65.9 | 90.5 | 61.5 | 63.4 | 47.4 | 92.1 | 55.7 | 68.0 | 1.4 |
| 5 | 63.8 | 88.1 | 65.2 | 72.8 | 52.9 | 88.5 | 63.0 | 65.7 | 1.2 |
| 6 | 64.0 | 86.3 | 61.3 | 68.2 | 52.4 | 86.7 | 56.5 | 61.1 | 1.2 |
| Average | 64.8 | 88.1 | 63.5 | 69.5 | 53.2 | 88.9 | 60.7 | 67.0 | 1.2 |

Comparative Examples C-1 to C-7

The following Examples C-1 to C-7 are multilayered films comprised of core layer 16 and skin layers 18 and 20. The layers are coextruded and then pinned by an air knife to casting roll 112.

Table 2 shows the 20° gloss and the 60° gloss as measured by Hunterlab's Progloss glossmeter (HG) and the 20° gloss and DOI as measured by Analytical Measurement Technology's glossmeter (AMT). The ratio of the machine direction DOI to the cross direction DOI is also shown for Examples C-1 to C-7.

Example C-1

Skin Layer 18: 0.30 mil

| | |
|---|---|
| 90.0% | Surlyn 9120 |
| 8.0% | Ampacet 10561 |
| 2.0% | Ampacet 10919 |

Core Layer 16: 2.40 mil

| | |
|---|---|
| 10.0% | Ampacet Black 190303 |
| 57.0% | Huntsman MDPE PE-1080 Resin |
| 5.0% | Surlyn 9120 |
| 25.0% | Equistar EVA 242F |
| 1.0% | Ampacet 10561 |

Skin Layer 20: 0.30 mil

| | |
|---|---|
| 2.0% | Ampacet 10919 |
| 1.0% | Ampacet 10561 |
| 72.0% | Huntsman MDPE PE-1080 |
| 25.0% | Equistar EVA 242F |

Example C-2

Skin Layer 18: 0.30 mil

| | |
|---|---|
| 91.0% | Surlyn 9120 |
| 8.0% | Ampacet 10561 |
| 1.0% | Ampacet 10919 |

Core Layer 16: 2.40 mil

| | |
|---|---|
| 14.0% | Ampacet Olympic Blue 160789 |
| 59.0% | Huntsman MDPE PE-1080 Resin |
| 1.0% | Ampacet 10919 |
| 25.0% | Equistar EVA 242F |
| 1.0% | Ampacet 10561 |

Skin Layer 20: 0.30 mil

| | |
|---|---|
| 1.0% | Ampacet 10919 |
| 1.0% | Ampacet 10561 |
| 73.0% | Huntsman MDPE PE-1080 |
| 25.0% | Equistar EVA 242F |

Example C-2

Skin Layer 18: 0.30 mil

| | |
|---|---|
| 91.0% | Surlyn 9120 |
| 8.0% | Ampacet 10561 |
| 1.0% | Ampacet 10919 |

Core Layer 16: 2.40 mil

| | |
|---|---|
| 34.0% | Ampacet Bright Orange 140079 |
| 38.0% | Huntsman MDPE PE-1080 Resin |
| 1.0% | Ampacet 10919 |
| 25.0% | Equistar EVA 242F |
| 1.0% | Ampacet 10561 |

Skin Layer 20: 0.30 mil

| | |
|---|---|
| 1.0% | Ampacet 10919 |
| 1.0% | Ampacet 10561 |
| 73.0% | Huntsman MDPE PE-1080 |
| 25.0% | Equistar EVA 242F |

Example C-4

Skin Layer 18: 0.30 mil

| | |
|---|---|
| 90.0% | Surlyn 9120 |
| 8.0% | Ampacet 10561 |
| 1.0% | Ampacet 10919 |

Core Layer 16: 2.40 mil

| | |
|---|---|
| 20.0% | Ampacet Almond 180478 |
| 52.0% | A. Schulman MDPE CP-879-01 |
| 2.0% | Ampacet 10919 |
| 25.0% | Equistar EVA 242F |
| 1.0% | Ampacet 10561 |

Skin Layer 20: 0.30 mil

| | |
|---|---|
| 2.0% | Ampacet 10919 |
| 1.0% | Ampacet 10561 |
| 72.0% | Rexene MDPE PE-1080 |
| 25.0% | Equistar EVA 242F |

Example C-5

Skin Layer 18: 0.30 mil

| | |
|---|---|
| 90.0% | Surlyn 9120 |
| 8.0% | Ampacet 10561 |
| 1.0% | Ampacet 10919 |

Core Layer 16: 2.40 mil

| | |
|---|---|
| 25.0% | Ampacet Purple 160901 |
| 47.0% | Huntsman MDPE CP-879-01 |
| 2.0% | Ampacet 10919 |
| 25.0% | Equistar EVA 242F |
| 1.0% | Ampacet 10561 |

Skin Layer 20: 0.30 mil

| | |
|---|---|
| 1.0% | Ampacet 10919 |
| 1.0% | Ampacet 10561 |
| 73.0% | Huntsman MDPE PE-1080 |
| 25.0% | Equistar EVA 242F |

Example C-6

Skin Layer 18: 0.30 mil

| | |
|---|---|
| 90.0% | Surlyn 9120 |
| 8.0% | Ampacet 10561 |
| 1.0% | Ampacet 10919 |

Core Layer 16: 2.40 mil

| | |
|---|---|
| 32.0% | Ampacet Sunflower Yellow 130293 |
| 40.0% | Huntsman MDPE PE-1080 |
| 2.0% | Ampacet 10919 |
| 25.0% | Equistar EVA 242F |
| 1.0% | Ampacet 10561 |

Skin Layer 20: 0.30 mil

| | |
|---|---|
| 1.0% | Ampacet 10919 |
| 1.0% | Ampacet 10561 |
| 73.0% | Huntsman MDPE PE-1080 |
| 25.0% | Equistar EVA 242F |

Example C-7

| | Skin Layer 18: 0.30 mil |
|---|---|
| 90.0% | Surlyn 9120 |
| 8.0% | Ampacet 10561 |
| 1.0% | Ampacet 10919 |
| | Core Layer 16: 2.40 mil |
| 18.0% | Ampacet Vivid Blue 160900 |
| 54.0% | Huntsman MDPE PE-1080 |
| 2.0% | Ampacet 10919 |
| 25.0% | Equistar EVA 242F |
| 1.0% | Ampacet 10561 |
| | Skin Layer 20: 0.30 mil |
| 1.0% | Ampacet 10919 |
| 1.0% | Ampacet 10561 |
| 73.0% | Huntsman MDPE PE-1080 |
| 25.0% | Equistar EVA 242F |

TABLE 2

| | Machine Direction | | | | Cross Direction | | | | DOI |
|---|---|---|---|---|---|---|---|---|---|
| Example | DOI | 60° HG | 20° ATI | 20° HG | DOI | 60° HG | 20° ATI | 20° HG | MD/CD |
| C-1 | 53.1 | 80.7 | 48.7 | 49.2 | 33.1 | 86.5 | 30.5 | 43.9 | 1.6 |
| C-2 | 57.7 | 83.7 | — | 56.4 | 34.5 | 85.9 | 42.2 | 50.5 | 1.7 |
| C-3 | 51.2 | 83.3 | 51.9 | 56.6 | 36.3 | 85.1 | 46.1 | 49.6 | 1.4 |
| C-4 | 53.0 | 81.4 | 46.0 | 46.2 | 33.8 | 85.4 | 32.7 | 37.9 | 1.6 |
| C-5 | 44.7 | 81.8 | 54.6 | 53.3 | 34.7 | 86.5 | 40.7 | 49.8 | 1.3 |
| C-6 | 51.2 | 85.6 | 51.8 | 49.6 | 33.3 | 89.7 | 42.5 | 49.3 | 1.5 |
| C-7 | 53.0 | 86.2 | 51.6 | 57.4 | 35.0 | 81.3 | 40.6 | 42.1 | 1.5 |
| Average | 52.0 | 83.2 | 50.8 | 52.7 | 34.4 | 85.8 | 39.3 | 46.2 | 1.5 |

Comparative Examples DC-1 to DC-5

The following Examples DC-1 to DC-5 are dispersion cast polymer films, commercially available from Avery Dennison as XL1000 Series cast vinyl films.

Table 3 shows the 20° gloss and the 60° gloss as measured by Hunterlab's ProGloss glossmeter (HG) and the 20° gloss and DOI as measured by Analytical Measurement Technology's glossmeter (AMT). The ratio of the machine direction DOI to the cross direction DOI is also shown for Examples DC-1 to DC-5.

TABLE 3

| | Machine Direction | | | | Cross Direction | | | | DOI |
|---|---|---|---|---|---|---|---|---|---|
| Example | DOI | 60° HG | 20° ATI | 20° HG | DOI | 60° HG | 20° ATI | 20° HG | MD/CD |
| DC-1 Black | 35.0 | 93.5 | 50.5 | 62.9 | 32.6 | 96.2 | 45.7 | 53.0 | 1.1 |
| DC-2 Canary Yellow | 31.8 | 90.0 | 37.5 | 53.9 | 30.0 | 88.5 | 36.1 | 50.1 | 1.1 |
| DC-3 Sapphire Blue | 35.2 | 95.1 | 57.6 | 68.6 | 32.7 | 93.9 | 56.8 | 66.6 | 1.1 |
| DC-4 White | 27.4 | 83.0 | 28.4 | 38.5 | 25.7 | 83.3 | 25.5 | 41.5 | 1.1 |
| DC-5 Cardinal Red | 38.8 | 87.5 | 46.2 | 52.5 | 33.1 | 85.0 | 39.3 | 40.0 | 1.2 |
| Average | 33.6 | 89.8 | 44.0 | 55.3 | 30.8 | 89.4 | 40.7 | 50.2 | 1.1 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method of making a high gloss multilayer thermoplastic film comprising:

(a) forming a molten coextrudate of polymeric film layers, said polymeric film layers comprising:

at least one polyolefin core layer having a first side and a second side;

at least one first thermoplastic skin layer having an outer surface wherein said first thermoplastic skin layer overlies the first side of the core layer; and at least one second thermoplastic skin layer having an outer surface wherein said second thermoplastic skin layer overlies the second side of the core layer;

wherein the composition of the core layer is different than the composition of the skin layers and the core layer and the skin layers being characterized by the absence of polyvinyl chloride; and (b) pinning said molten coextrudate onto a cooled casting roll having a surface roughness of no more than $R_a$=0.025 microinches with a pinning roll under sufficient pressure to produce a film having a smooth first skin layer outer surface, wherein said smooth first skin layer outer surface has a ratio of distinctness of image in the machine direction to distinctness of image in the cross direction in the range of 1:1 to 1.3:1 and has a 20° gloss in both the machine direction and the cross direction is at least 40.

2. The method of claim 1 wherein the pressure between the pinning roll and the casting roll is at in the range of 30 to 100 pounds per linear inch.

3. The method of claim 1 wherein said first skin outer surface is free of gels defects.

4. The method of claim 1 further comprising heating said film, followed by embossing said film by passing said heated film through a nip area formed between an embossing roll and a smooth roll.

5. The method of claim 1 further comprising heating said film, followed by passing said heated film through a nip area formed between a polished roll and a second pinning roll.

6. The method of claim 1 wherein said polymeric film layers further comprises an intermediate core layer positioned between the core layer and the second thermoplastic skin layer, the intermediate core layer being characterized by the absence of PVC.

7. The method of claim 1 further comprising applying a clear topcoat layer over said first thermoplastic skin layer, wherein the clear topcoat layer is characterized by the absence of PVC.

8. The method of claim 1 wherein said core layer further comprises at least one second polymeric material selected from the group consisting of ethylene-unsaturated carboxylic acid copolymers, ethylene-methacrylate acid copolymers, ionomers derived from sodium, lithium or zinc and an ethylene/unsaturated carboxylic acid copolymer, and combinations thereof.

9. The method of claim 1 wherein said first skin layer is comprised of an ionomer derived from sodium, lithium or zinc and an ethylene/unsaturated carboxylic acid copolymer.

10. The method of claim 1 wherein the 20° gloss in both the machine direction and the cross direction is at least 50.

11. The method of claim 1 wherein the 20° gloss in both the machine direction and the cross direction is at least 60.

12. A multilayer thermoplasic film comprising:
   at least one polyolefin core layer having a first side and a second side;
   at least one first thermoplastic skin layer having an outer surface wherein said first thermoplastic skin layer overlies the first side of the core layer; and
   at least one second thermoplastic skin layer overlying the second side of the core layer;
      wherein the composition of the core layer is different than the composition of the skin layers and the core layer and the skin layers being characterized by the absence of polyvinyl chloride and wherein said outer surface of said first thermoplastic skin layer has a ratio of distinctness of image in the machine direction to distinctness of image in the cross direction in the range of 1:1 to 1.3:1 and has a 20° gloss in both the machine direction and the cross direction of at least 40.

13. The film of claim 12 wherein the first skin layer is clear.

14. The film of claim 12 wherein the first skin layer is comprised of an ionomer derived from sodium, lithium or zinc and an ethylene/unsaturated carboxylic acid copolymer.

15. The film of claim 12 wherein the first skin layer further comprises an antistatic agent.

16. The film of claim 12 wherein the first skin layer further comprises a UV light stabilizer.

17. The film of claim 12 wherein the outer surface of said first skin layer is free of gel imperfections.

18. The film of claim 12 wherein the 20° gloss in both the machine direction and the cross direction is at least 50.

19. The film of claim 12 wherein the 20° gloss in both the machine direction and the cross direction is at least 60.

* * * * *